United States Patent
Le Vau

[15] 3,688,434
[45] Sept. 5, 1972

[54] SNAGLESS FISHING APPARATUS

[72] Inventor: Walter H. Le Vau, Minneapolis, Minn.

[73] Assignee: Ronald E. Anderson, Minneapolis, Minn.; a part interest

[22] Filed: Oct. 28, 1970

[21] Appl. No.: 84,553

[52] U.S. Cl..............................43/44.97, 43/43.15
[51] Int. Cl. ...............................................A01k 95/00
[58] Field of Search......43/44.97, 44.96, 43.1, 44.81, 43/43.15

[56] References Cited

UNITED STATES PATENTS

| | | | |
|---|---|---|---|
| 2,109,693 | 3/1938 | Gaines et al. | 43/44.97 |
| 285,075 | 9/1883 | Rix | 43/44.97 |
| 3,490,167 | 1/1970 | Turle | 43/44.97 |
| 2,989,817 | 6/1961 | Kepler | 43/44.81 X |
| 3,076,284 | 2/1963 | Adams | 43/43.1 |
| D176,592 | 1/1956 | Candella | 43/44.96 X |
| 3,490,166 | 1/1970 | Whisenhunt | 43/44.97 X |

OTHER PUBLICATIONS

Bouncy Manufacturing Co., Sales Brochure Form 167.

*Primary Examiner*—Samuel Koren
*Assistant Examiner*—J. F. Pitrelli
*Attorney*—Williamson, Palmatier & Bains, H. Dale Palmatier, Herman H. Bains and Malcolm L. Moore

[57] ABSTRACT

A snagless fishing lure or sinker having a smoothly curved wire bail embedded in an extending from the body of the lure or sinker near the front and rear ends thereof to form front and rear notches with the body at the bail's points of entry. A fishing swivel, attachable to a fishing line or leader, is slidably mounted on the bail for smoothly sliding movement between front and rear notches, the swivel nesting at the front notch to define a normal trolling position wherein the swivel contacts the body. In response to a forward pull on the line or leader, the front end of the body rises thereby avoiding snagging of the body as the body moves forward through the water. If the front end of the body wedges in a snag and thereby tensions the fishing line, line tension exerts a force on the body which causes the rear end of the body to rise sliding the swivel rearwardly along the bail and rotating the body and nesting the swivel at the rear notch so the snagged body can be pulled out of the snag.

3 Claims, 6 Drawing Figures

PATENTED SEP 5 1972

3,688,434

INVENTOR.
WALTER H. LE VAU
BY
Williamson, Palmatier
& Bains
ATTORNEYS

SNAGLESS FISHING APPARATUS

The purpose of the foregoing abstract is to enable the Patent Office and the public generally, and especially the scientists, engineers, or practitioners in the art who are not familiar with patent or legal terms of phraseology, to determine quickly from a cursory inspection the nature and essence of the technical disclosure of the application. The abstract is neither intended to define the invention of the application, which is measured by claims, nor is it intended to be limiting as to the scope of the invention in any way.

BACKGROUND OF THE INVENTION

Although development of weedless hooks greatly diminished fishing lure losses caused by hook snagging, it did little to prevent snagging losses due to wedging of fishing lures or sinkers between the rocks, logs, or roots commonly encountered on lake or river bottoms. Wedging losses are particularly frequent during hot summer months when fishermen are forced to troll the lake or river bottoms, which frequently are cluttered with rocks, logs and other obstructions.

When lures or sinkers become wedged between rocks or logs during trolling, a forward pull ordinarily wedges them more solidly until ultimately line breakage occurs. Frequently the only way a fishman was able to free the lure or sinker was to exert sufficient force to pull it out of the snag. With the ever increasing popularity of spin fishing and low test lines, retrieval of wedged lures or sinkers becomes more difficult since such lines can withstand only low pulling forces which are often inadequate to free the lure or sinker.

It is desirable to develope a snagless lure or sinker apparatus which is resistant to wedging between rocks or logs, and if wedged can be easily freed without application of forces high enough to break the fishing line. If the lure or sinker should become snagged, its design should permit it to rapidly free itself without generating forces adequate to cause line breakage. The force buildup should be low enough to permit use of the apparatus with light spinning tackle. Such a lure or sinker apparatus should respond to fishing line pull by immediately raising its forward end because such behavior makes the apparatus considerably more snag resistant than many known devices whose front ends drop in response to fishing line pull. Preferably, the front end of the lure or sinker should be blunt to avoid any deep penetration between lake bottom obstructions. It is particularly desirable to avoid flat shovel-like configurations for the apparatus since these shapes are most susceptible to wedging between rocks or logs.

SUMMARY OF THE INVENTION

The invention comprises a fishing lure or sinker apparatus with a smoothly curved wire bail embedded in and extending from the body of the lure or sinker near the front and rear ends thereof to form front and rear notches with the body at the bail's points of entry. A fishing swivel is slidably mounted on the bail for smoothly sliding movement between front and rear notches. During normal trolling the swivel nests in the front notch contacting the body so as to raise the front end of the body in response to a pull by a fishing line fastened to the swivel, thereby reducing the probability of snagging an underwater obstruction.

If the front end of the body does become wedged between rocks, logs, or the like, the slightest fishing line tension slides the swivel from the front notch rearwardly along the bail, and this movement raises the rear end, gradually rotating the body. When the fishing swivel reaches the rear notch, the body can be pulled rearwardly out of the snag.

When the invention is embodied in a sinker, an eyelet with a fishing swivel and clasp attached thereto extends from the rear end of the body. A conventional fishing leader may be connected to the clasp and a fishing lure to the leader. When used as a sinker, the invention's blunt cylindrical body produces a substantially constant low drag when trolled through the water. Many prior art trolling planes and sinkers exhibit erratic or varying drag characteristics when trolled due to the structure's geometry and the manner of its attachment with the fishing line.

It should be understood that the invention can also be used on most presently available fishing lures. For example a conventional fishing plug can be equipped with the smoothly curved bail thereby making it less prone to snagging or underwater obstructions. Jigs are well adapted for use with the invention.

The invention is particularly well adapted for the low test lines commonly associated with spinning tackle because the snagless fishing apparatus invention requires only a minimum of force on the fishing line to slide the swivel rearwardly along the bail, rotating and releasing the apparatus from an underwater snag. Prior art devices required substantially larger forces to free them, and the larger forces often resulted in line breakage.

DESCRIPTION AND OPERATION OF THE INVENTION

Figure 1:
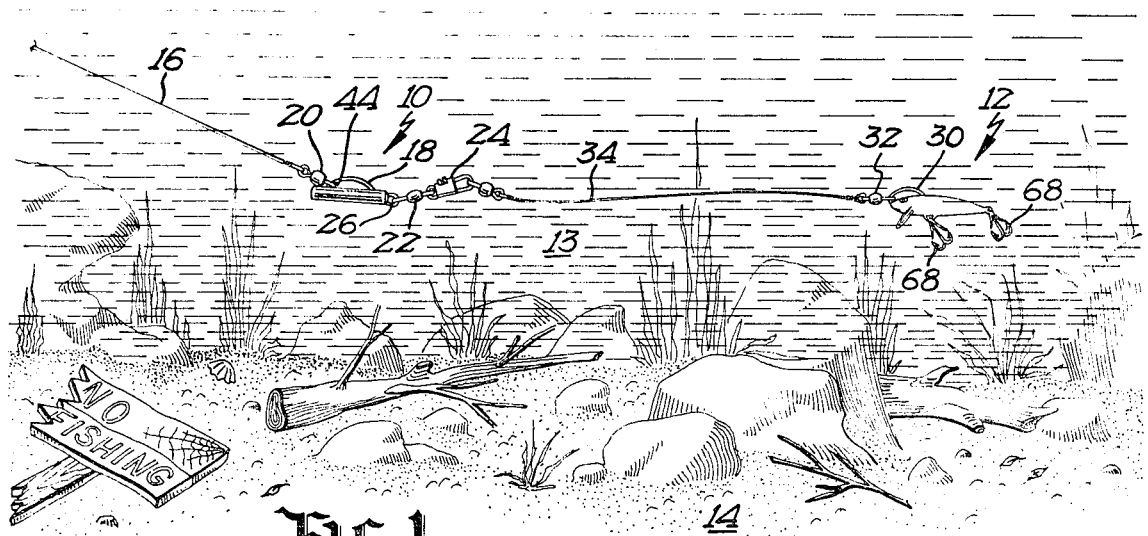
FIG. 1 is a perspective view showing a trolled sinker and lure constructed in accordance with the invention.

FIG. 1 shows the invention embodied in both fishing sinker 10 and fishing lure 12, both fishing apparatuses being trolled through the water 13 above a lake or stream bottom 14 by fishing line 16. The fishing sinker 10 has a smoothly curved wire bail 18 extending therefrom, a fishing swivel 20 being mounted on the bail for smoothly sliding movement therealong. Another fishing swivel 22 and a clasp 24 are hung from an eyelet 26 protruding from the rear end 28 of the sinker 10. The fishing lure 12, with a like bail 30 extending therefrom and a fishing swivel 32 slidably mounted thereon, is connected to the clasp 24 of sinker 10 through leader 34.

Figure 2:
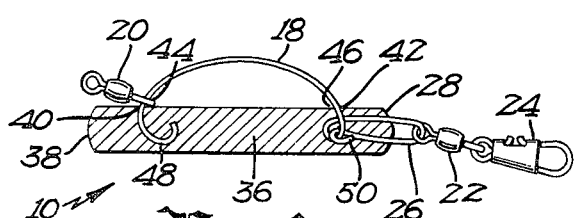
FIG. 2 is a cross sectional side view of a fishing sinker embodying the invention.

Referring now to FIG. 2, sinker 10 has an elongated cylindrical, weighted body 36 with a blunt front end 38. The body may be formed of lead or other heavy material. The body 36 has smoothly curved wire bail 18 embedded therein and extending therefrom at points of entry 40 and 42 near front and rear ends respectively, of the body, the plane of the bail 18 passing through the central axis of the cylindrical body. Angled front and rear notches 44 and 46, respectively, are formed at the points of entry of bail 18 into the cylindrical body. Mounted on the bail 18 for smoothly sliding movement between the front and rear notches is a fishing swivel 20, which is attachable to a conventional fishing line.

The wire forming the bail 18 is twisted at end 48 to better retain it in the body. The second end 50 of the wire is looped several times to form and secure an eyelet 26 which protrudes from the rear end 28 of the body and also aids in retaining the bail in the body. If desired, the eyelet may be formed of a loop of wire separate from that forming the bail. A fishing swivel 22 and clasp 24 are hung from the eyelet; a fishing leader is ordinarily attached to the clasp 24.

It is extremely important that bail 18 be smoothly curved without any angled sections between notches 44 and 46. The smooth curve permits smoothly sliding movement of swivel 20 from front notch 44 to rear notch 46 when the sinker becomes wedged between underwater obstructions as will be described hereafter.

Figure 3:
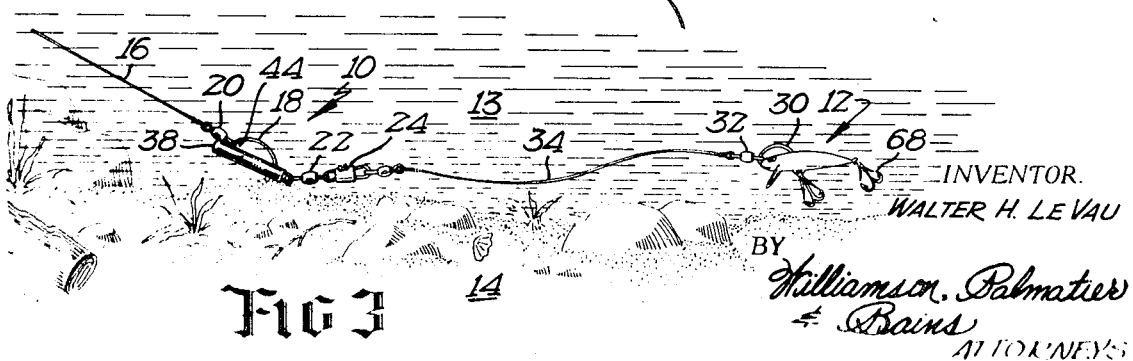
FIG. 3 is a side view showing the front end of the invention immediately rising in response to a pulling fishing line.

The front end 38 of the sinker should be blunt as shown in FIG. 2 to discourage wedging between logs or rocks on the bottom. During normal trolling the slightest pull of a fishing line 16 nests swivel 20 in the front notch 44 thereby immediately raising the front end 38 of the sinker (FIG. 3) to further avoid snagging during trolling or casting.

Figure 4:
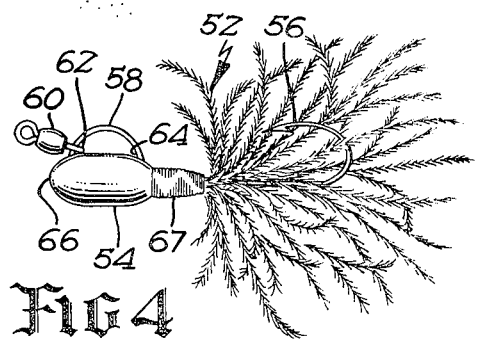
FIG. 4 is a side view of a fishing jig embodying the invention.

Besides having utility as a fishing sinker, the invention can be embodied in other fishing apparatuses such as plugs, jigs, and most other lures. FIG. 4 shows the invention embodied in a jig 52 having a weighted body 54 and rearwardly extending hook 56. A smoothly curved wire bail 58 is embedded in and extends from the body which may be formed of lead. A fishing swivel 60 is mounted on bail 58 for smoothly sliding movement from a front notch 62 rearwardly to rear notch 64. The blunt front end 66 of the jig is useful to avoid wedging, although the invention works satisfactorily without it. If the invention is embodied in a plug or other lure, the bail should be mounted on the lure with the forward notch of the bail at the same location on the lure that the pulling eye ordinarily occupies, thereby retaining the desired behavior of the fishing lure.

Referring again to FIG. 1 the lure 12 has a smoothly curved bail 30 extending therefrom, the bail being of identical construction to that described for sinker 10 and jig 52. A swivel 32 connects to fishing leader 34, the swivel mounted for smoothly sliding movement along the bail 30. It is particularly advantageous to use the sinker 10 to lower an otherwise buoyant fishing lure 12, embodying the invention, deep in the lake for trolling over rocky areas. The buoyant fishing lure floats above the level of most underwater obstructions, while the sinker 10 settles intermittently on the lake bottom to produce a swimming action for the lure. Due to the novel construction of sinker 10, snagging seldom occurs. Use of weedless hooks 68 on the fishing lure further reduces the snagging probability.

In operation, when the invention is embodied in a fishing sinker 10, the swivel 20 is attached to the end of a fishing line 16 (FIGS. 1–3) by tieing the fishing line to the swivel. The clasp 24, extending from swivel 22 of the sinker is attached to a fishing leader 34, from which a fishing lure 12 is trailed. The lure may also be equipped with the invention as shown in FIG. 1. Naturally, both lure and sinker need not utilize the invention, but the likelihood of snagging is further diminished if both are provided with the smoothly curved bails of the invention.

Under normal trolling conditions, the swivel 20 nests at the front notch 44, contacting the body 36. As the sinker lies on the lake bottom 14 between retrieves, the slightest forward pull on the fishing line 16 raises the front end 38 of the sinker 10 (FIG. 3) thereby reducing the likelihood of the sinker engaging a snag as compared with many prior art sinkers and lures which lower their front ends, sometimes even digging into the lake bottom in response to pull on the fishing line. The elongated cylindrical cross section of the sinker and its blunt front end 38 produce substantially constant, low drag as it is trolled through the water. Regardless of the trolling depth or the angle of retrieve, the drag is essentially constant.

Figure 5:
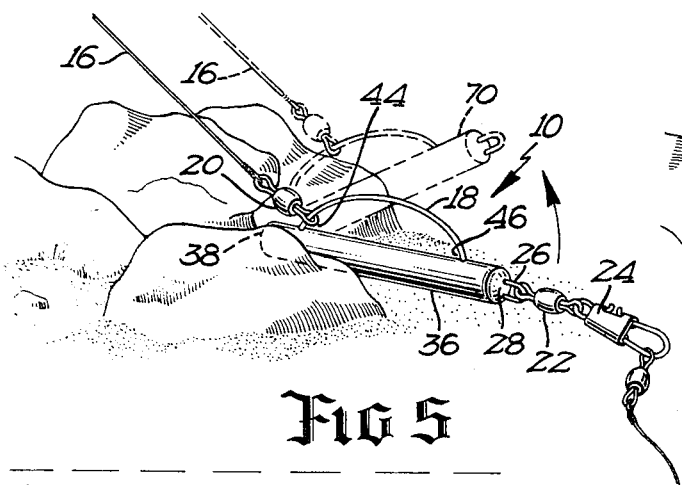
FIGS. 5 and 6 are perspective drawings illustrating the de-snagging action of the invention.
Figure 6:
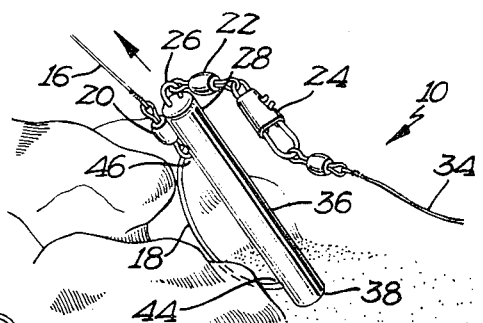

In the event the sinker becomes wedged between adjoining rocks or logs like those shown in FIGS. 5 and 6, the tension of the fishing line or cord 16 slides swivel 20 rearwardly along bail 18 from front notch 44 to rear notch 46. As the swivel moves rearwardly it exerts a force on the body 36, raising the rear end 28 of the sinker and causing the sinker to gradually rotate as shown by dotted outline 70 in FIG. 5. When the swivel 20 reaches the rear notch 46, the smooth cylindrical sinker 10 reaches a de-snagging position (FIG. 6) and can be easily withdrawn from the obstruction. The construction of the invention thus permits retrieval of a snagged sinker thereby avoiding the often expensive loss of sinker, lure, and leader frequently occurring with prior art apparatuses.

When the invention is embodied in a jig like that shown in FIG. 4, the operation is essentially the same as that described for the fishing sinker 10. A fishing leader is attached to the swivel 60 and a fishing line to the leader. The blunt front end 66 of the jig resists wedging, but if wedged between rocks or logs the swivel 60 slides smoothly rearward along the bail 58 causing the jig to rotate, the rear end 67 moving upward. This rotating movement releases the jig from the obstruction in the same manner described for sinker 10. Since jigs are frequently used on rocky river or lake bottoms, the invention can greatly decrease the likelihood of their loss due to wedging between the rocks and logs frequently found here.

While the preferred embodiments of the present invention have been described, it should be understood that various changes, adaptations and modifications may be made therein without departing from the spirit of the invention and the scope of the appended claims.

What is claimed is:

1. A snagless fishing sinker attachable between a fishing line and a leader which extends from a fishing lure comprising:

an elongated cylindrical weighted body to generate a substantially constant low drag when moved in a direction parallel to the axis of said elongated body beneath the surface of the water;

a smoothly curved wire bail embedded in and extending from the body near front and rear ends thereof, the plane of the bail passing through the axis of the cylindrical body, and the bail forming angled front and rear notches with the body at its points of entry into the body and the bail remaining in a substantially upright orientation when moving through the water;

a fishing swivel for attachment to said fishing line, the swivel slidably mounted on the bail for smoothly sliding movement between said front and rear notches, the swivel nesting at the front notch to define a normal trolling position wherein the swivel contacts the weighted body, raises the front end of the body to avoid snagging of the body, and pulls the body forward through the water, the swivel nesting at the rear notch to define a de-snagging position, wherein when the front end of the body engages a snag, fishing line tension slides the swivel rearwardly along the bail exerting a force on the body causing the rear end of the body to rise, thereby rotating the body so the swivel nests at the rear notch and the snagged body can be pulled backward and out of the snag;

an eyelet at the rear end of the body; and a fishing swivel and clasp mounted to said eyelet for attachment to said fishing leader extending from the fishing lure, the fishing lure providing a dragging force on the elongate body to keep the bail in an upright orientation and the elongate body in a generally horizontal position as the fishing line pulls the elongate body forwardly in a generally horizontal direction through the water thus decreasing the likelihood of the bait catching on underwater obstacles.

2. The combination according to claim 1 wherein said bail and eyelet are formed from a single continueous wire, one end of the wire being twisted and embedded in the body to aid in its retention in the body, the other end of the wire being looped within the body to protrude from the rear end of the body to form the said eyelet.

3. A snagless fishing apparatus for use beneath the surface of a body of water comprising:

an elongated cylindrical weighted body to generate a substantially constant low drag when moved in a direction parallel to the axis of the cylindrical body beneath the surface of the water;

a smoothly curved wire bail embedded in and extending from the body near front and rear ends thereof, the plane of the bail passing through the axis of the cylindrical body, and the bail forming angled front and rear notches with the body at its points of entry into the body and the bail remaining in a substantially upright orientation when moving through the water;

a fishing swivel slidably mounted on the bail for smoothly sliding movement between said front and rear notches, the swivel nesting at the front notch to define a normal trolling position wherein the swivel contacts the weighted body, raises the front end of the body to avoid snagging of the body, and pulls the body forward through the water, the swivel nesting at the rear notch to define a de-snagging position, wherein when the front end of the body engages a snag, fishing line tension slides the swivel rearwardly along the bail exerting a force on the body causing the rear end of the body to rise, thereby rotating the body so the swivel nests at the rear notch and the snagged body can be pulled backward and out of the snag;

an eyelet at the rear end of the body;

a fishing swivel and clasp mounted to said eyelet;

a fishing line extending from the fisherman to the said swivel slidably mounted on the bail; and a fishing leader and fishing lure at an end of said leader, the leader having its other end attached to said eyelet;

the fishing line, said swivel slidably mounted to said bail, the bail, said elongate body, said eyelet, said leader, and said fishing lure forming successive elements in a single column extending from the fisherman; and said leader and said fishing lure establishing a dragging force on said elongate body as it moves through the water to thereby retain the bail in a substantially upright orientation and the elongate body in a generally horizontal position as the body moves forwardly in a generally horizontal direction through the water thus decreasing the likelihood of the bail catching on underwater obstacles.

* * * * *